(12) United States Patent
Idris (10) Patent No.: US 10,093,237 B1
(45) Date of Patent: Oct. 9, 2018

(54) AUDIBLE ALERT SYSTEM FOR TRUCK OPERATORS

(71) Applicant: Ammar Idris, Windsor (CA)

(72) Inventor: Ammar Idris, Windsor (CA)

( * ) Notice: Subject to any disclaimer, the term of this patent is extended or adjusted under 35 U.S.C. 154(b) by 0 days.

(21) Appl. No.: 15/865,464

(22) Filed: Jan. 9, 2018

(51) Int. Cl.
  *B60R 1/12* (2006.01)
  *G06K 9/00* (2006.01)
  *B65G 67/02* (2006.01)
  *B60C 5/00* (2006.01)

(52) U.S. Cl.
  CPC ............... *B60R 1/12* (2013.01); *B60C 5/005* (2013.01); *B65G 67/02* (2013.01); *G06K 9/00791* (2013.01); *B60R 2001/1253* (2013.01); *B60R 2001/1276* (2013.01)

(58) Field of Classification Search
  CPC ............ B60R 1/12; B60R 2001/1276; B60R 2001/1253; G06K 9/00791; B60Q 5/005; B65G 67/02
  See application file for complete search history.

(56) References Cited

U.S. PATENT DOCUMENTS

| | | | |
|---|---|---|---|
| 5,453,735 A | 9/1995 | Hahn | |
| 6,634,139 B1 | 10/2003 | Metz | |
| 6,870,473 B2 | 3/2005 | Brown, Jr. | |
| 6,985,073 B1 | 1/2006 | Doan | |
| 7,333,016 B2 | 2/2008 | Ancel | |
| 9,305,460 B1 | 4/2016 | Aza | |
| D763,938 S | 8/2016 | Muehlemann | |
| 2006/0050149 A1* | 3/2006 | Lang | B60R 1/00 348/148 |
| 2015/0145697 A1* | 5/2015 | Barbeau | G08G 1/096 340/907 |
| 2016/0232414 A1* | 8/2016 | Salomonsson | G08G 1/167 |
| 2016/0314689 A1 | 10/2016 | Priest, III | |

* cited by examiner

*Primary Examiner* — Brian Wilson
(74) *Attorney, Agent, or Firm* — Kyle A. Fletcher, Esq.

(57) ABSTRACT

The audible alert system for truck operators comprises a mirror unit and a cab unit. The mirror unit attaches to an external mirror of the truck where it has an unobstructed view of the system. The mirror unit comprises a camera, which captures images of the area behind the truck and a processor that analyzes the images looking for a change in the dock light system. Whenever the mirror unit detects that the dock light system has changes, it wirelessly transmits a notification to the cab unit. The cab unit receives the notification and activates a sound transducer and/or indictor light to alert the truck operator. The truck operator may silence the sound transducer and/or extinguish the indicator light by pressing a reset button on the cab unit.

16 Claims, 6 Drawing Sheets

AUDIBLE ALERT SYSTEM FOR TRUCK OPERATORS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of freight transportation, more specifically, an audible alert system for truck operators.

It is a common practice in the freight industry to provide a system of red/green lights on an external wall at each docking bay where a truck may load or unload. Either the red light or the green light, but not both, will be illuminated to signal instructions to the truck operator. When the red light is illuminated, it signals to the truck operator that the truck is to remain stationary. When the green light is illuminated, it signals to the truck operator that the truck is free to depart. A truck operator who is reading paperwork or planning a delivery route, and therefore not constantly watching the system of red/green lights, may not notice the change in lights and may therefore waste time sitting at a loading dock when they have been cleared to depart.

SUMMARY OF INVENTION

The audible alert system for truck operators comprises a mirror unit and a cab unit. The mirror unit attaches to an external mirror of the truck where it has an unobstructed view of the system. The mirror unit comprises a camera, which captures images of the area behind the truck and a processor that analyzes the images looking for a change in the dock light system. Whenever the mirror unit detects that the dock light system has changes, it wirelessly transmits a notification to the cab unit. The cab unit receives the notification and activates a sound transducer and/or indictor light to alert the truck operator. The truck operator may silence the sound transducer and/or extinguish the indicator light by pressing a reset button on the cab unit.

An object of the invention is to detect a change in the status of a dock light system.

Another object of the invention is to notify a truck operator that the status of the dock light system has changed.

A further object of the invention is to provide a mirror unit that mounts onto an external mirror of a truck to monitor the dock light system.

Yet another object of the invention is to provide a cab unit that receives a notification from the mirror unit and alerts the truck operator using audible and/or visual indications.

These together with additional objects, features and advantages of the audible alert system for truck operators will be readily apparent to those of ordinary skill in the art upon reading the following detailed description of the presently preferred, but nonetheless illustrative, embodiments when taken in conjunction with the accompanying drawings.

In this respect, before explaining the current embodiments of the audible alert system for truck operators in detail, it is to be understood that the audible alert system for truck operators is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the audible alert system for truck operators.

It is therefore important that the claims be regarded as including such equivalent construction insofar as they do not depart from the spirit and scope of the audible alert system for truck operators. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
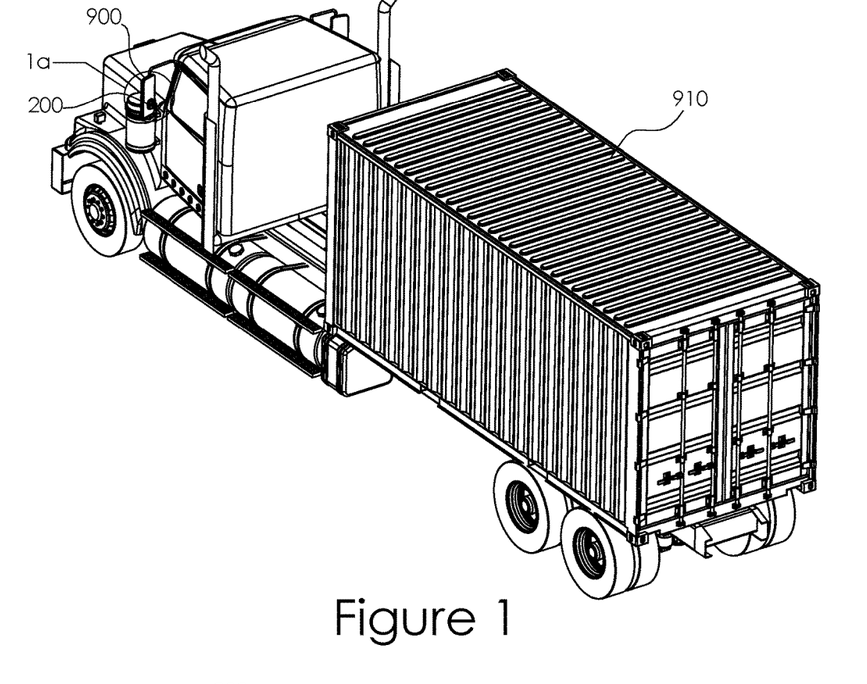
FIG. 1 is a perspective view of an embodiment of the disclosure.
Figure 1A:
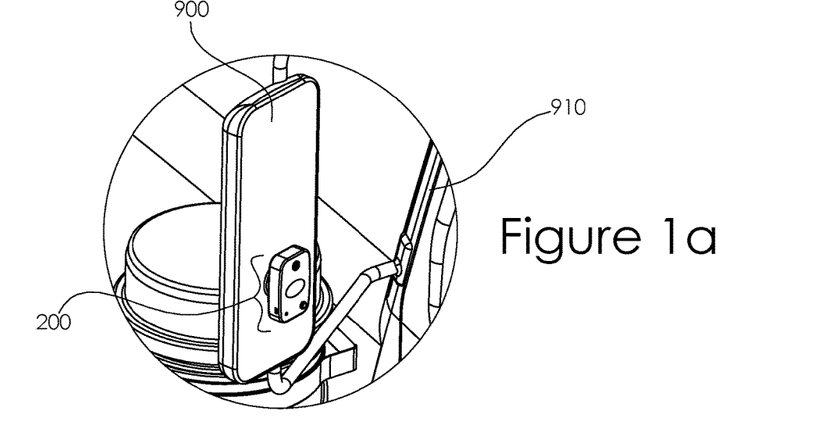
FIG. 1a is a detail view of an embodiment of the disclosure as shown in FIG. 1, focusing on the external side mirror.
Figure 2:
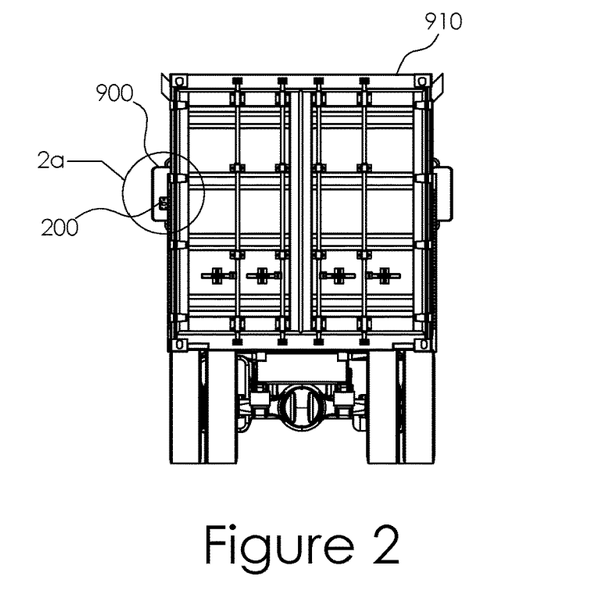
FIG. 2 is a rear view of an embodiment of the disclosure.
Figure 2A:
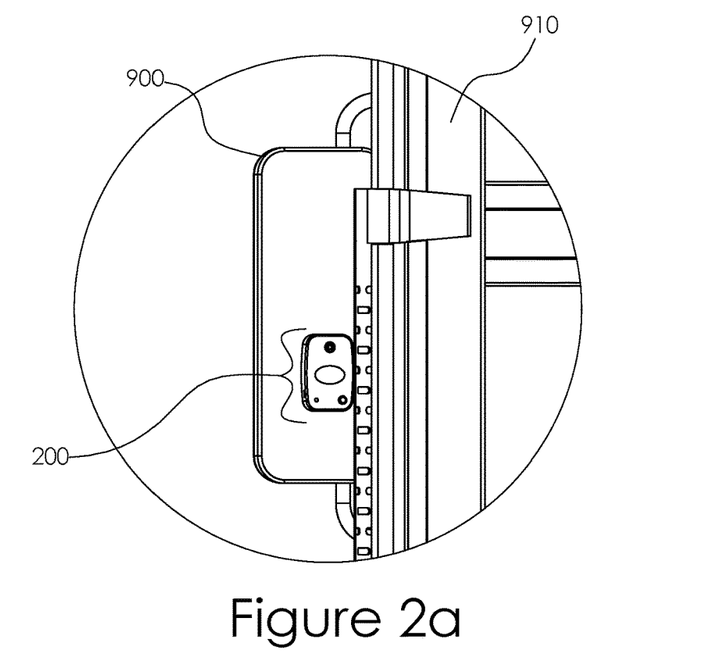
FIG. 2a is a detail view of an embodiment of the disclosure as shown in FIG. 2, focusing on the external side mirror.
Figure 3:
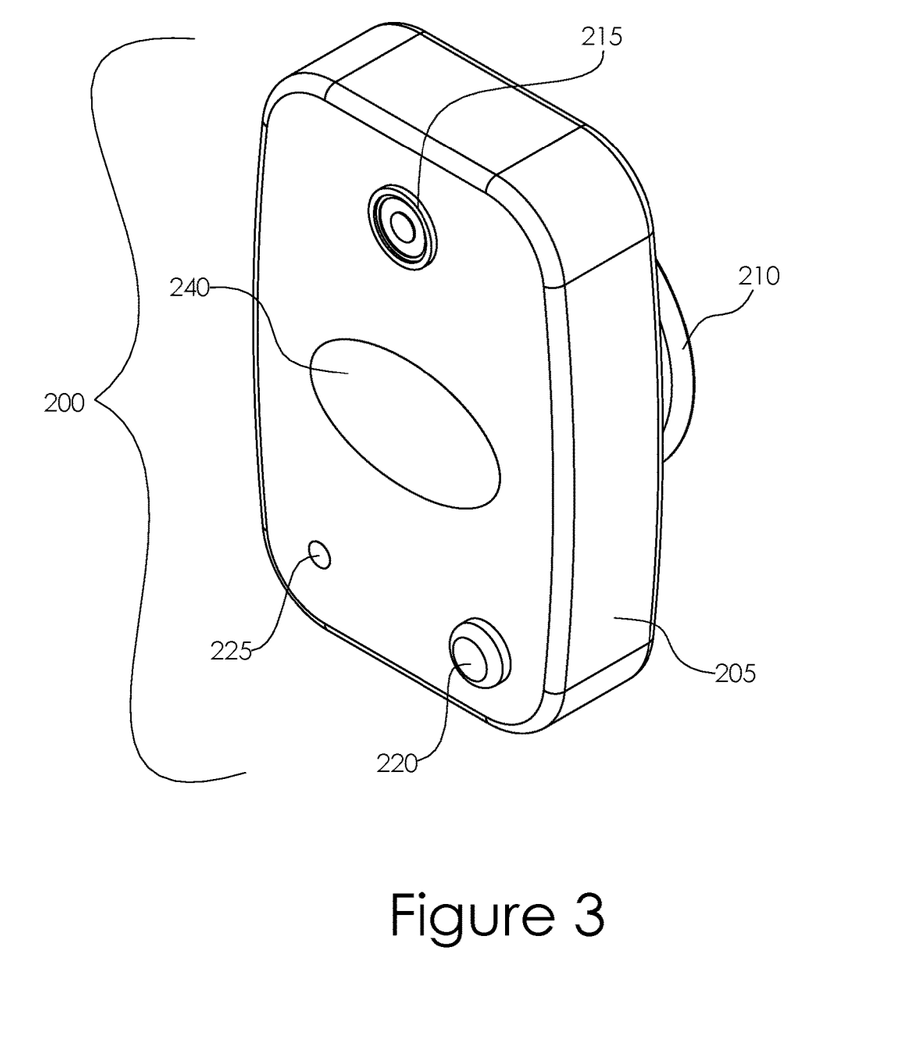
FIG. 3 is a perspective view the mirror unit of an embodiment of the disclosure.
Figures 4, 5:
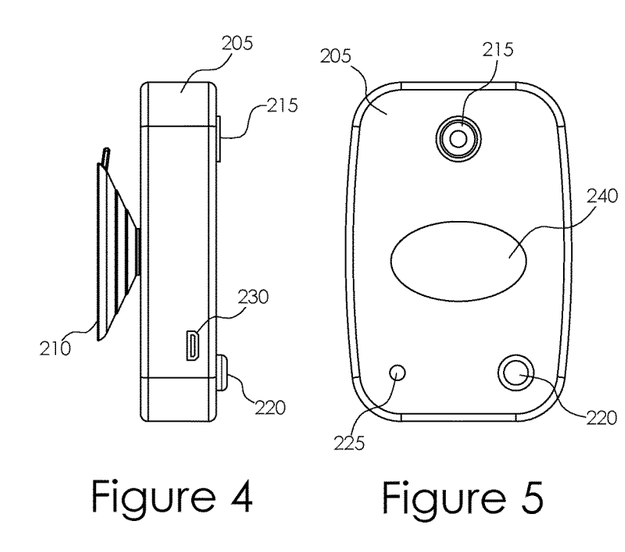
FIG. 4 is a left side view of the mirror unit of an embodiment of the disclosure.
FIG. 5 is a front view of the mirror unit of an embodiment of the disclosure.
Figure 6:
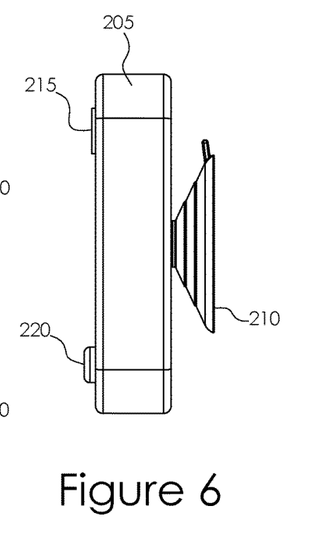
FIG. 6 is a right side view of the mirror unit of an embodiment of the disclosure.
Figure 7:
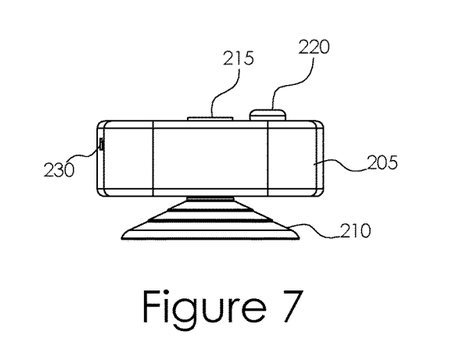
FIG. 7 is a bottom view of the mirror unit of an embodiment of the disclosure.
Figure 8:
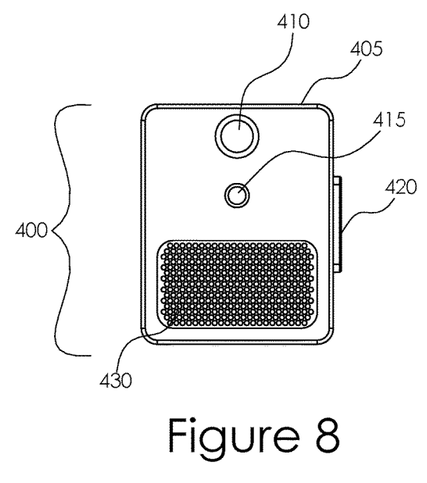
FIG. 8 is a front view of the cab unit of an embodiment of the disclosure.
Figure 9:
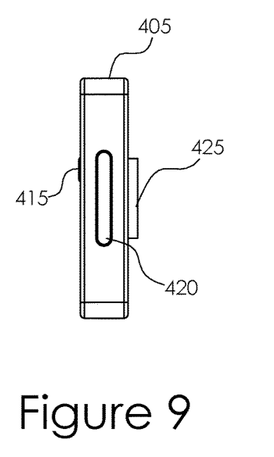
FIG. 9 is a right side view of the cab unit of an embodiment of the disclosure.
Figure 10:
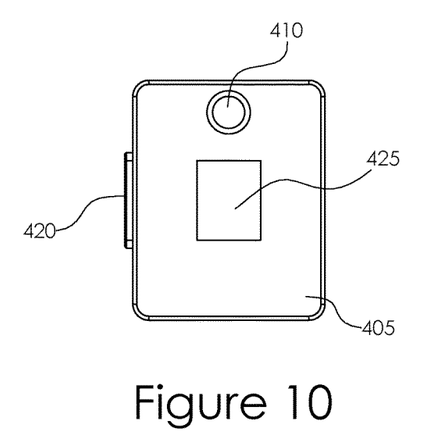
FIG. 10 is a rear view of the cab unit of an embodiment of the disclosure.
Figure 11:
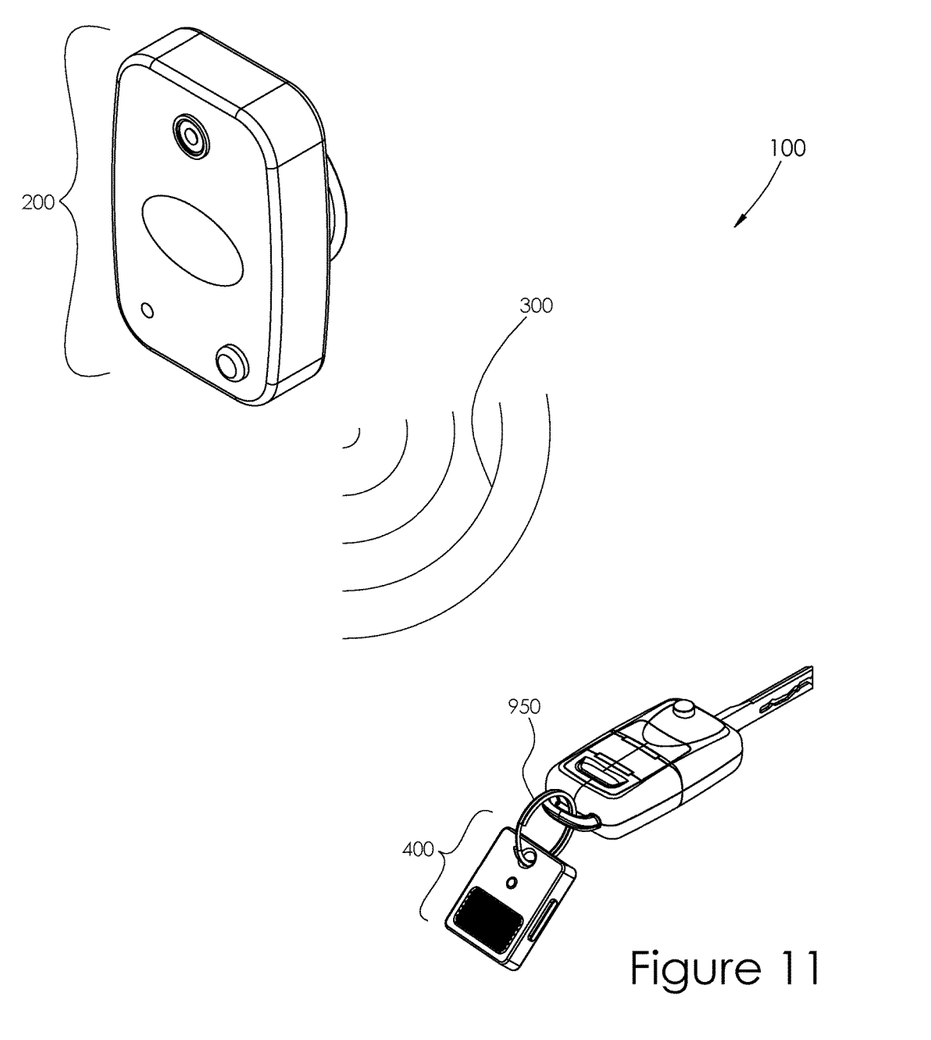
FIG. 11 is an in-use view of an embodiment of the disclosure.

Detailed reference will now be made to a first potential embodiment of the disclosure, which is illustrated in FIGS. 1 through 11.

The audible alert system for truck operators 100 (hereinafter invention) comprises a mirror unit 200 and a cab unit 400. The mirror unit 200 may attach to a side mirror 900 of a truck 910 and may monitor a dock light system (not illustrated in the figures) at a loading bay (not illustrated in the figures). The mirror unit 200 may wirelessly transmit a notification signal 300 to the cab unit 400 indicating a transition of the dock light system. Responsive to the notification signal 300, the cab unit 400 may be adapted to audibly and/or visually notify a truck operator (not illustrated in the figures) of the transition of the dock light system.

Throughout this disclosure, the front of the mirror unit 200 is defined to be the side of a first housing 205 that comprises an imaging device 215 and the front of the cab unit 400 is defined to be the side of a second housing 405 that comprises a sound transducer 430. The rear of the mirror unit 200 is the side of the first housing 205 that is opposite the front of the mirror unit 200. The rear of the cab unit 400 is the side of the second housing 405 that is opposite of the front of the cab unit 400. Left and right for the mirror unit 200 and the cab unit 400 are defined based upon the left and right, respectively, of the truck operator while the truck operator is looking at the front of the mirror unit 200 or the front of the cab unit 400. The left side of the truck operator coincides with the left side of the mirror unit 200/the cab unit 400 and the right of the truck operator coincides with the right side of the mirror unit 200/the cab unit 400. When the mirror unit 200 or the cab unit 400 is held in front of the truck operator with the mirror unit 200 or the cab unit 400 correctly oriented in a left and right sense and the front side oriented vertically, the bottom is the side of the mirror unit 200 or the cab unit 400 that is closest to the ground and the top is the side that is opposite the bottom.

The mirror unit 200 comprises the first housing 205, the imaging device 215, a first control circuit (not illustrated in the figures), an operator control 220, a first indicator 225, a first battery (not illustrated in the figures), and a charging port 230. The mirror unit 200 couples to the side mirror 900 of the truck 910 and is oriented such that the imaging device 215 points towards the rear of the truck 910.

The first housing 205 may be an enclosure for the mirror unit 200. The first control circuit, the imaging device 215, the operator control 220, the first indicator 225, the first battery, and the charging port 230 may be coupled to and/or contained within the first housing 205.

In some embodiments, the front of the first housing 205 may include an area designated for use by a logo 240.

The imaging device 215 may be a camera that converts a visual scene presented to the imaging device 215 into an image, which is an electronic representation of the scene. The imaging device 215 may be electrically coupled to the first control circuit so that the images produced by the imaging device 215 are available for use by the first control circuit.

The first control circuit may comprise a first microprocessor (not illustrated in the figures), first memory (not illustrated in the figures), and first input/output modules (not illustrated in the figures) to execute a first software program (not illustrated in the figures) stored within the first memory. The first control circuit may monitor the level of the first battery and may manage the charging of the first battery from the charging port 230. The first control circuit may manage the visual state of the first indicator 225. The first control circuit may further comprise a transmitter (not illustrated in the figures) to send the notification signals 300 to the cab unit 400. The first control circuit may monitor the images obtained from the imaging device 215 for an indication that the dock light system has changed state.

Specifically, the first control circuit may obtain the image from the imaging device 215 and designate the image as a previous image. After the passing of a first timed interval, the first control circuit may again obtain the image from the imaging device 215 and designate it as a next image. The first control circuit may compare the previous image with the next image. If the previous image matches the next image within some predefined margin of error, the first control circuit may conclude that the dock light system has not changed state and the notification signal 300 does not need to be sent.

If the first control circuit concludes that the differences between the previous image and the next image indicate a change in the state of the dock light system, the first control circuit may transmit the notification signal 300 using the transmitter. As a non-limiting example, the conclusion that the dock light system has changed state may be based upon the differences between the previous image and the next image indicating that an area of the next image has become less green, an area of the next image has become less red, an area of the next image has become more green, an area of the next image has become more red, or combinations thereof.

Regardless of whether the notification signal 300 was sent or not, the first control circuit may release the space occupied in the first memory by the previous image, designate the next image as the previous image, wait for the first timed interval, capture the image from the imaging device 215 which it may designate as the next image, and repeat the comparisons of the previous image and the next image. The first control circuit may repeat this cycle of waiting and comparing the next image with the previous image until the mirror unit 200 is powered off or until the first battery is depleted.

In some embodiments, the first microprocessor, the first memory, the first input/output modules, or combinations thereof may reside in a single electrical component.

The operator control 220 may turn the mirror unit 200 on and off. The first indicator 225 may provide a visual indication that the mirror unit 200 is on or off. The first indicator 225 may also provide a visual indication of a low charge on the first battery. As a non-limiting example, the first indicator 225 may blink when the first battery needs to be recharged.

The first battery may provide electrical energy to power the operation of the mirror unit 200. The first battery may be rechargeable by plugging a power cord (not illustrated in the figures) into the charging port 230. The first battery and the charging port 230 may be electrically wired to the first control circuit.

The cab unit 400 comprises the second housing 405, a second control circuit (not illustrated in the figures), the sound transducer 430, a reset button 420, a second indicator 415, and a second battery (not illustrated in the figures). The cab unit 400 may be a portable device that receives the notification signal 300 from the mirror unit 200. Responsive to receiving the notification signal 300 from the mirror unit 200, the cab unit 400 may be adapted to alert the truck operator that the mirror unit 200 has detected a change of state of the dock light system.

The second housing 405 may be an enclosure for the cab unit 400. The sound transducer 430, the reset button 420, the second indicator 415, and the second battery may be coupled to and/or contained within the second housing 405. The second housing 405 may comprise a key ring aperture 410 for attaching the cab unit 400 to a keyring 950. In some embodiments, the second housing may comprise a clip 425 for attaching the cab unit 400 to a sun visor or other interior area of the truck 910.

The second control circuit may control the operation of the cab unit 400. The second control circuit may determine when and how the second indicator 415 is illuminated. The second control circuit may determine when and how the sound transducer 430 is activated. The second control circuit may read the state of the reset button 420 and determine what action is taken when the reset button 420 is activated. The second control circuit may monitor the level of the second battery and may provide a low battery warning as the second battery approaches depletion.

In some embodiments, the second control circuit may comprise a second microprocessor (not illustrated in the figures), second memory (not illustrated in the figures), and second input/output modules (not illustrated in the figures) to execute a second software program (not illustrated in the figures) stored within the second memory.

The second control circuit may further comprise a receiver (not illustrated in the figures) to receive the notification signals 300 sent by the mirror unit 200. Specifically, when the mirror unit 200 sends the notification signal 300 to the cab unit 400 indicating that the state of the dock light system has changed, the second control circuit may apply an audio signal to the sound transducer 430. The sound transducer 430 may convert the audio signal into an audible sound to call attention to the change in the state of the dock light system. The audio signal may be applied to the sound transducer 430 for a second timed interval or until silenced by activating the reset button 420. The reset button 420 may be a control accessible on a side of the cab unit 400 that is adapted to allow the truck operator to acknowledge receipt of the notification signal 300.

The second indicator 415 may provide a visual indication that the cab unit 400 has received the notification signal 300 from the mirror unit 200. As a non-limiting example, responsive to the cab unit 400 receiving the notification signal 300, the cab unit 400 may illuminate the second indicator 415. The second indicator 415 may remain illuminated for the second timed interval or until extinguished by activating the reset button 420. The second indicator 415 may also provide a visual indication of a low charge on the second battery. As a non-limiting example, the second indicator 415 may blink when the second battery needs to be recharged.

The second battery may provide electrical energy to power the operation of the cab unit 400. The second battery may be replaceable via a battery cover (not illustrated in the figures) on the rear side of the cab unit 400. The second battery may be electrically wired to the second control circuit.

The rear of the first housing 205 may comprise a suction cup 210. The suction cup 210 may couple the mirror unit 200 to the side mirror 900. It shall be noted that the first housing 205 may include magnets (not depicted), which may be used to secure the first housing 205 to the trailer 910 or to a metal surface in proximity of the side mirror 900. Use of magnets and suction cups are well known in virtually every art unit, and substitution of one for the other requires little modification. This goes without saying that there may be times where the cab unit 400 and the trailer 910 are not aligned, and the side mirror 900 does not provide a direct line of sight, in which case the use of magnets may be warranted.

In some embodiments, the notification signal 300 sent from the mirror unit 200 to the cab unit 400 may indicate the red/green state of the dock light system and the cab unit 400 may show the state of the dock light system on the cab unit 400. As a non-limiting example, if the second indicator 415 on the cab unit 400 can be illuminated in at least a red state and a green state, the second control circuit may illuminate the second indicator 415 in the red state or the green state by selecting the color to match the information contained in the notification signal 300. Therefore, responsive to the dock light system changing from red to green, the notification signal 300 sent from the mirror unit 200 may comprise information the dock light system is now green and the cab unit 400 may illuminate the second indicator 415 in the green state while the audio signal is applied to the sound transducer 430.

As used in this disclosure, an "aperture" is an opening in a surface. Aperture may be synonymous with hole, slit, crack, gap, slot, or opening.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts, which may not be illustrated in the figures.

As used in this disclosure, a "camera" is a sensor that converts light into electric signals that encode and records the spatial orientation of the captured light in a manner that reproduces the images seen by a human eye.

As used in this disclosure, a "clip" is a fastener that attaches to an object by gripping or clasping the object. A clip is typically spring loaded.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used in this disclosure, a "housing" is a rigid casing that encloses and protects one or more devices.

As used in this disclosure, an "image" is an optical representation or reproduction of an indicia or of the appearance of something or someone.

As used in this disclosure, the word "interior" is used as a relational term that implies that an object is located or contained within the boundary of a structure or a space.

As used in this disclosure, a "logo" is artwork that is typically associated with an organization, brand, or activity. The logo may be textual, graphical, or both.

As used herein, the term "low charge" refers to a level of electrical charge remaining in a battery after the battery has been in use. A low charge implies that the remaining charge in the battery has reached a warning threshold level which typically represents from 1 to 25% of total battery capacity remaining. A system having a low charge condition may present an audible and/or visual indication of the low charge warning as a low charge alarm or low charge alert.

As used in this disclosure, a "mirror" is a surface that is designed to reflect light with a minimum of dispersion or absorption. In some embodiments, a mirror may be formed with curved surfaces that are used to magnify the reflected image or to enlarge the field of view of the reflected image.

As used in this disclosure, a "port" is an electrical termination that is used to connect a first electrical circuit to a second external electrical circuit.

As used herein, the terms "processor", "central processor", "central processing unit", "CPU", or "microprocessor" refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used in this disclosure, a "suction cup" refers to an object or device that uses negative fluid pressure of air or water to adhere to nonporous surfaces by creating a partial vacuum.

As used in this disclosure, a "transducer" is a device that converts a physical quantity, such as pressure or brightness into an electrical signal or a device that converts an electrical signal into a physical quantity.

Throughout this document references to "wire", "wires", "wired", or "wiring" may describe and/or show a single conductor when, in fact, two conductors may be required to power or control a subsystem; a convention used herein is to not show the common return conductor to which all electrical subsystems are connected—this common return conductor is a continuous electrical path and does not pass through any type of switch or other electrical component other than the possibility of passing through one or more connectors.

With respect to the above description, it is to be realized that the optimum dimensional relationship for the various components of the invention described above and in FIGS. 1 through 11, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An audible alert system for truck operators comprising:
   a mirror unit and a cab unit;
   wherein the mirror unit attaches to a side mirror of a truck and monitors a dock light system at a loading bay;
   wherein the mirror unit wirelessly transmits a notification signal to the cab unit indicating the dock light system has changed state; wherein responsive to the notification signal, the cab unit is configured to audibly and/or visually notify a truck operator the dock light system has changed state;
   wherein the mirror unit comprising a first housing, an imaging device, a first control circuit, an operator control, a first indicator, a first battery, and a charging port;
   wherein the mirror unit couples to the side mirror of the truck and is oriented such that the imaging device points towards the rear of the truck;
   wherein the first housing is an enclosure for the mirror unit;
   wherein the first control circuit, the imaging device, the operator control, the first indicator, the first battery, and the charging port are coupled to and/or contained within the first housing;
   wherein the imaging device is a camera that converts a visual scene presented to the imaging device into images, which are an electronic representation of the scene;
   wherein the imaging device is electrically coupled to the first control circuit so that the images produced by the imaging device are available for use by the first control circuit;
   wherein the first control circuit comprises a first microprocessor, first memory, and first input/output modules to execute a first software program stored within the first memory;
   wherein the first control circuit monitors a level of the first battery and manages charging of the first battery from the charging port;
   wherein the first control circuit manages a visual state of the first indicator;
   wherein the first control circuit further comprise a transmitter to send the notification signal to the cab unit;
   wherein the first control circuit monitors the images obtained from the imaging device for an indication that the dock light system has changed state.

2. The audible alert system for truck operators according to claim 1 wherein the first control circuit obtains a first image from the images of the imaging device and designates the first image as a previous image; wherein after the passing of a first timed interval, the first control circuit obtains a second image from the images of the imaging device and designates it as a next image;
   wherein the first control circuit compares the previous image with the next image;
   wherein if the previous image matches the next image within some predefined margin of error, the first control circuit concludes that the dock light system has not changed state and the notification signal does not need to be sent;
   wherein if the first control circuit concludes that differences between the previous image and the next image indicate the dock light system has changed state, the first control circuit transmits the notification signal using the transmitter.

3. The audible alert system for truck operators according to claim 2
   wherein the conclusion that the dock light system has changed state is based upon the differences between the previous image and the next image indicating that an area of the next image has become less green, an area of the next image has become less red, an area of the next image has become more green, an area of the next image has become more red, or combinations thereof.

4. The audible alert system for truck operators according to claim 3
wherein regardless of whether the notification signal was sent or not, the first control circuit releases space occupied in the first memory by the previous image, designates the next image as the previous image, waits for the first timed interval, obtains a third image from the images of the imaging device which it designates as the next image, and repeats the comparisons of the previous image and the next image;
wherein the first control circuit repeats this cycle of waiting and comparing the next image with the previous image until the mirror unit is powered off or until the first battery is depleted.

5. The audible alert system for truck operators according to claim 4
wherein the operator control turns the mirror unit on and off;
wherein the first indicator provides a visual indication that the mirror unit is on or off;
wherein the first indicator provides a visual indication of a low charge on the first battery.

6. The audible alert system for truck operators according to claim 5
wherein the first battery provides electrical energy to power the mirror unit;
wherein the first battery is rechargeable by plugging a power cord into the charging port;
wherein the first battery and the charging port are electrically wired to the first control circuit.

7. The audible alert system for truck operators according to claim 6
wherein the cab unit comprises a second housing, a second control circuit, a sound transducer, a reset button, a second indicator, and a second battery;
wherein the cab unit is a portable device that receives the notification signal from the mirror unit;
wherein responsive to receiving the notification signal from the mirror unit, the cab unit is configured to alert the truck operator that the mirror unit has detected the dock light system has changed state.

8. The audible alert system for truck operators according to claim 7
wherein the second housing is an enclosure for the cab unit;
wherein the sound transducer, the reset button, the second indicator, and the second battery are coupled to and/or contained within the second housing;
wherein the second housing comprises a key ring aperture for attaching the cab unit to a keyring.

9. The audible alert system for truck operators according to claim 8
wherein the second housing comprises a clip for attaching the cab unit to an interior area of the truck.

10. The audible alert system for truck operators according to claim 8
wherein the second control circuit controls the cab unit;
wherein the second control circuit determines when and how the second indicator is illuminated;
wherein the second control circuit determines when and how the sound transducer is activated;
wherein the second control circuit determines what action is taken when the reset button is activated;
wherein the second control circuit provides a low battery warning as the second battery approaches depletion.

11. The audible alert system for truck operators according to claim 10
wherein the second control circuit comprises a second microprocessor, second memory, and second input/output modules to execute a second software program stored within the second memory.

12. The audible alert system for truck operators according to claim 10
wherein the second control circuit comprises a receiver to receive the notification signal sent by the mirror unit;
wherein when the mirror unit sends the notification signal to the cab unit indicating that the dock light system has changed state, the second control circuit applies an audio signal to the sound transducer;
wherein the sound transducer converts the audio signal into an audible sound to call attention that the dock light system has changed state;
wherein the audio signal is applied to the sound transducer for a second timed interval or until silenced by activating the reset button;
wherein the reset button is a control accessible on a side of the cab unit that is configured to allow the truck operator to acknowledge receipt of the notification signal.

13. The audible alert system for truck operators according to claim 12
wherein the second indicator provides a visual indication that the cab unit has received the notification signal from the mirror unit;
wherein responsive to the cab unit receiving the notification signal, the cab unit illuminates the second indicator;
wherein the second indicator remains illuminated for the second timed interval or until extinguished by activating the reset button;
wherein the second indicator also provides a visual indication of a low charge on the second battery;
wherein the second indicator blinks when the second battery needs to be recharged.

14. The audible alert system for truck operators according to claim 13
wherein the second battery provides electrical energy to the cab unit;
wherein the second battery is replaceable via a battery cover on the rear side of the cab unit;
wherein the second battery is electrically wired to the second control circuit.

15. The audible alert system for truck operators according to claim 14
wherein the rear of the first housing comprises a suction cup;
wherein the suction cup couples the mirror unit to the side mirror.

16. The audible alert system for truck operators according to claim 15
wherein the notification signal sent from the mirror unit to the cab unit indicates the red/green state of the dock light system and the cab unit shows the red/green state of the dock light system on the cab unit.

* * * * *